United States Patent
Ukai et al.

(10) Patent No.: US 7,108,938 B2
(45) Date of Patent: Sep. 19, 2006

(54) SINGLE CELL FOR A SOLID OXIDE FUEL CELL

(75) Inventors: Kenji Ukai, Tokai (JP); Kouji Hisada, Tokai (JP)

(73) Assignee: Toho Gas Co., Ltd., Nagoya (JP)

( * ) Notice: Subject to any disclaimer, the term of this patent is extended or adjusted under 35 U.S.C. 154(b) by 585 days.

(21) Appl. No.: 10/619,315

(22) Filed: Jul. 14, 2003

(65) Prior Publication Data

US 2004/0072060 A1    Apr. 15, 2004

(30) Foreign Application Priority Data

Jul. 19, 2002    (JP) .............................. 2002-210856

(51) Int. Cl.
  *H01M 4/86*    (2006.01)
(52) U.S. Cl. .............................. 429/40; 429/32; 429/33; 429/30; 429/45; 429/41
(58) Field of Classification Search ................. 429/40, 429/33, 32, 30, 45, 41
  See application file for complete search history.

(56) References Cited

U.S. PATENT DOCUMENTS

| | | | |
|---|---|---|---|
| 5,035,962 A | 7/1991 | Jensen | |
| 5,629,103 A | 5/1997 | Wersing et al. | |
| 6,232,009 B1 | 5/2001 | Batawi | |
| 6,667,126 B1 | 12/2003 | Landes et al. | |
| 6,849,354 B1 * | 2/2005 | Hara et al. | ........... 429/33 |
| 6,893,760 B1 * | 5/2005 | Shibata et al. | ........... 429/30 |

2002/0048699 A1    4/2002  Steele et al.

FOREIGN PATENT DOCUMENTS

| | | |
|---|---|---|
| EP | 0 586 264 | 3/1994 |
| EP | 1 202 370 | 5/2002 |
| JP | 04-230955 | 8/1992 |
| JP | 06-107462 | 4/1994 |
| JP | 07-069721 | 3/1995 |
| JP | 08-250135 | 9/1996 |
| JP | 09-190825 | 7/1997 |
| JP | 11-502052 | 2/1999 |
| JP | 11-246220 | 9/1999 |
| JP | 2001-176518 | 6/2001 |
| JP | 2001-283877 | 10/2001 |
| JP | 2002-134131 | 5/2002 |
| WO | 96/28856 | 9/1996 |
| WO | 98/43308 | 10/1998 |

* cited by examiner

*Primary Examiner*—Laura Weiner
(74) *Attorney, Agent, or Firm*—Burr & Brown

(57) ABSTRACT

A single cell for a solid oxide fuel cell and a solid oxide fuel cell using the same practicable and excellent in generation performance and durability, wherein a fuel electrode including a cermet of a catalyst and a second solid electrolyte with oxide ion conductivity at 1000° C. of 0.20 S/cm or more is bonded to one side of a solid electrolyte plate with the conductivity of 0.07 S/cm or more and bending strength of 700 MPa or more, and an air electrode including a compound of perovskite type transition metal oxide with a third solid electrolyte is bonded to the other side. A surface of the fuel electrode is coated with a layer, and an air electrode surface is coated with a layer, and an aqueous solution where a noble metal compound is dissolved in water is impregnated into the air electrode.

27 Claims, 5 Drawing Sheets

SINGLE CELL FOR A SOLID OXIDE FUEL CELL

This application claims the benefit of Japanese Application 2002-210856, filed Jul. 19, 2002, the entirety of which is incorporated herein by reference.

BACKGROUND OF THE INVENTION

1. Field of the Invention

The present invention relates to a single cell for a solid oxide fuel cell and a solid oxide fuel cell using the same, more particularly to a single cell for a solid oxide fuel cell and a solid oxide fuel cell using the same which are preferably used for a distributed power source, a cogeneration system or the like in urban areas.

2. Description of Related Art

A solid oxide fuel cell (hereinafter referred to as an "SOFC") is a fuel cell in which a solid electrolyte showing oxide ion conductivity is used as an electrolyte. In the SOFC, since the electrolyte is solid, there is no problem of dissipation of the electrolyte, and long life can be expected. Further, as an operating temperature is as high as about 1000° C., the utility value of waste heat is also high. Furthermore, as an output power density is high, the SOFC can be expected to be compact and of high efficiency.

In general, cell structures of the SOFC are broadly divided into those of planar type, tubular type and integral type. Among them, the planar type SOFC has advantages of high power density as internal resistance is comparatively low, and of high output power density per unit area because thin cells are laminated.

The planar type SOFC is further broadly divided into those of a self-supporting electrolyte film type and of a supported electrolyte film type. The former one has a structure in which a plurality of single cells are laminated via a separator, wherein both sides of a plate solid electrolyte are bonded to a fuel electrode brought into contact with a fuel gas such as hydrogen and city gas, and to an air electrode brought into contact with an oxidant gas such as air and oxygen.

On the other hand, the latter one has a structure in which a plurality of single cells are laminated via a separator, wherein a very thin solid electrolyte film is supported by a thick fuel electrode, and a thin air electrode is bonded to the other side of the thin solid electrolyte film.

In the SOFC with such a constitution, if the fuel electrode and the air electrode are provided with the fuel gas and the oxidant gas, respectively, since there exists a difference between oxygen partial pressure on the air electrode side and that on the fuel electrode side, the oxygen ionizes at the air electrode and is carried through the solid electrolyte to the fuel electrode, then the oxide ion at the fuel electrode reacts with the fuel gas to emit an electron. Therefore, if a load is connected to the fuel and air electrodes, it becomes possible to directly take out free energy change of the cell reaction as electrical energy for power generation.

Incidentally, for the solid electrolyte used in the above-mentioned SOFC, yttria-stabilized zirconia (hereinafter referred to as "YSZ") is conventionally used. However, YSZ is of high internal resistance and shows low oxide ion conductivity. Therefore, recently, in view of improving the output power density, lowering the operating temperature and the like of SOFC, attention has been directed at scandia-stabilized zirconia (hereinafter referred to as "ScSZ"), and a variety of researches are conducted.

For example, Japanese Patent Application Unexamined Publication No. Hei6-107462 discloses a technique relating to a single cell for an SOFC, and an SOFC in which a solid electrolyte is scandia and alumina-stabilized zirconia prepared by substituting a part of Sc in ScSZ which contains Sc as a main dopant with Al with stable tervalence for maintaining the oxide ion conductivity higher than that of YSZ and for suppressing phasetransition.

In addition, generally, for the fuel electrode, a cermet of Ni and YSZ containing 8 mol % of $Y_2O_3$ (hereinafter referred to as "Ni-8YSZ") or the like is used. For the air electrode, (La, Sr) $MnO_3$ being perovskite type transition metal oxide or the like is used. For the separator, $LaCrO_3$ or the like is used.

However, even if a single cell for an SOFC and an SOFC are constituted by using the above-mentioned materials as a solid electrolyte, a fuel electrode, an air electrode and a separator (in the case of the SOFC), it cannot be necessarily said that a single cell for an SOFC and an SOFC having practicable generating performance and durability are directly obtained.

That is because, since the single cell and the SOFC are used while being bonded to or in contact with different types of constituting materials at the times of manufacture, fabrication and operation, the cell performance is greatly influenced not only by material properties exhibited by each constituting material such as the oxide ion conductivity of the solid electrolyte or mechanical characteristics such as strength and toughness, or electrode activity of the fuel electrode and the air electrode or the like, but also by an interaction between the different types of constituting materials such as a bonding state of the solid electrolyte to both of the electrodes or a contact state of each electrode with the separator. Therefore, unless a comprehensive development is performed in view of those characteristics, it can be said that a single cell for an SOFC and an SOFC capable of developing excellent generating performance and durability as a cell are not obtained.

Consequently, in the case of putting the single cell and the SOFC into practical use at an early stage, it is specifically important to improve the cell performance of the single cell itself being a fundamental unit structure, and not to degrade the cell performance in the case of stacking the single cells. That is because, depending on the constitution of the single cell, the generating performance and the durability developed by the single cell becomes entirely alien, and as a result, the generating performance and the durability of the SOFC when a plurality of the single cells are stacked are greatly influenced.

SUMMARY OF THE INVENTION

An object of the invention is to overcome the problems described above and to provide a single cell for an SOFC and an SOFC using the same which have excellent generating performance and durability, and are practicable.

Additionally, another object of the invention is to provide a single cell for an SOFC and an SOFC using the same which are suitably used for a cell structure of planar type, specifically, of self-supporting film type.

According to a single cell consistent with the present invention, as a first solid electrolyte is excellent in oxide ion conductivity and mechanical characteristics, there are advantages that the excellent oxide ion conductivity enables obtaining sufficient generating capacity and that the excellent mechanical characteristics cause excellence in durability as a structure. In addition, since a fuel electrode is comprised of a cermet of a catalyst and a second solid electrolyte showing high oxide ion conductivity, and an air electrode is comprised of a compound of perovskite type transition metal oxide with a third solid electrolyte, a larger amount of oxide ion ionized at the air electrode is shifted from the air electrode to the first solid electrolyte, and a larger amount of oxide ion is provided from the first solid electrolyte to the triple phase boundary of the fuel electrode. Accordingly, there is an advantage that high generating efficiency and output stability are obtained.

At this time, if a surface of the first solid electrolyte is made rough by surface treatment, a contact area of the first solid electrolyte with the electrodes bonded to the both sides of the first solid electrolyte is increased to improve the adhesion between the first solid electrolyte and the electrodes and to increase the area of the triple phase boundary of the first solid electrolyte, the electrodes, and the gas phase. Therefore, there is an advantage that the generating performance may be further improved.

In addition, since an aqueous solution where a water-soluble noble metal compound is dissolved in water is previously impregnated into the air electrode, noble metal generated by heating at the time of the first operation acts as a co-catalyst, and ionization of oxygen molecule provided to the air electrode is accelerated. Therefore, there is an advantage that the generating performance of the single cell is further improved by an interaction between the action of the co-catalyst solution and that of the air and fuel electrodes described above.

Further, a surface of the fuel electrode is coated with a fuel electrode contact layer comprised of a fuel electrode contact material containing metal fine particles. Therefore, when the single cells are stacked to be the SOFC via a separator, the adhesion between the fuel electrode and the separator is enhanced and contact resistance is decreased to improve current collecting efficiency, and there is an advantage that the generating performance of the SOFC is greatly improved.

Furthermore, a surface of the air electrode is coated with an air electrode contact layer comprised of an air electrode contact material containing a material of which electric conductivity is higher than that of the air electrode material in a temperature region for power generation. Therefore, there is an advantage that resistance in the direction of the plane of the first solid electrolyte may be reduced, and cell performance degradation associated with upsizing of the cell is prevented, so that practicality of the single cell is enhanced. In addition, since the electric conductivity of the air electrode comes not to affect the cell performance, the degree of flexibility in a design of the air electrode is enhanced, so that the practicality of the single cell is enhanced.

In addition, if the single cells are stacked to be the SOFC via the separator, the adhesion between the air electrode and the separator is enhanced and the contact resistance is decreased to improve current collecting efficiency. Therefore, there is an advantage that the generating performance of the SOFC is improved.

As mentioned above, the single cell consistent with the present invention is practically excellent in the generating performance, the durability and the like. Moreover, an interaction caused by the contact of each electrode with the separator when those single cells are stacked is fully taken into consideration. Therefore, the SOFC made by laminating the single cells via the separator is also practically excellent in generating performance, durability and the like.

Additional objects and advantages of the invention are set forth in the description which follows, are obvious from the description, or. may be learned by practicing the invention. The objects and advantages of the invention may be realized and attained by the single cell for the solid oxide fuel cell and the solid oxide fuel cell using the same in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
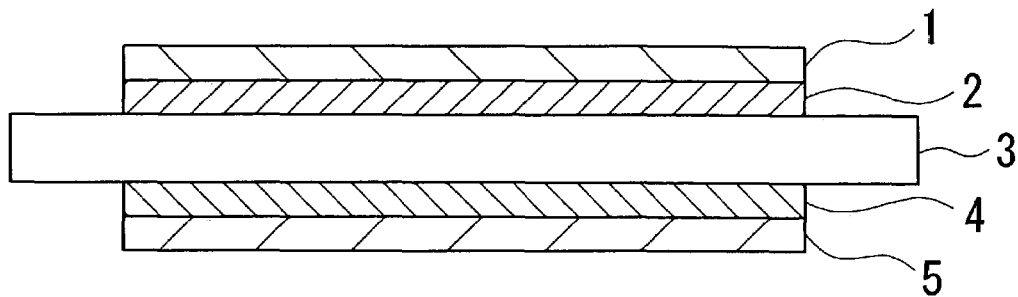
FIG. 1 is a schematic diagram of a cell structure of a single cell for an SOFC consistent with one preferred embodiment of the present invention.

A detailed description of one preferred embodiment of a single cell for an SOFC and an SOFC using the same embodied by the present invention is provided below in detail. A single cell for an SOFC consistent with the present invention is provided with a first solid electrolyte showing oxide ion conductivity, a fuel electrode comprised of a cermet of a catalyst and a second solid electrolyte and being bonded to one side of the first solid electrolyte, and an air electrode comprised of a compound of perovskite type transition metal oxide and a third solid electrolyte and being bonded to the other side of the first solid electrolyte. The first solid electrolyte shows predetermined oxide ion conductivity and has mechanical characteristics, and the second solid electrolyte shows high oxide ion conductivity. A surface of the fuel electrode is coated with a fuel electrode contact layer, and that of the air electrode is coated with an air electrode contact layer. An aqueous solution where a water-soluble noble metal compound is dissolved in water is impregnated into the air electrode.

First, the first solid electrolyte which constitutes the single cell for the SOFC will be described. In the first solid electrolyte used here, the oxide ion conductivity at not less than 1000° C. is 0.07 S/cm or more, and the bending strength at ambient temperature is 700 MPa or more. In view of ensuring generating performance and durability of the single cell, the oxide ion conductivity at 1000° C. is preferably 0.08 S/cm or more, and the bending strength at ambient temperature is preferably 800 MPa or more. More preferably, the oxide ion conductivity at 1000° C. is 0.09 S/cm or more and the bending strength at ambient temperature is 1000 MPa or more. Incidentally, the bending strength at ambient temperature is a value measured in accordance with JIS R1601 of the Japanese Industrial Standards.

As for the first solid electrolyte satisfying those conditions, a dispersion strengthened solid electrolyte is mentioned as a suitable example, wherein ScSZ in which a predetermined amount of $Sc_2O_3$ is solubilized in $ZrO_2$ is a parent phase, a predetermined amount of $Al_2O_3$ is dispersed therein, and a crystal phase mainly is comprised of a phase of a tetragonal crystal.

In this case, the $Sc_2O_3$ content of ScSZ is preferably 3 to 6 mol %. If the $Sc_2O_3$ content is in that range, the crystal phase practically becomes the phase of a tetragonal crystal, and the first solid electrolyte is excellent in the mechanical characteristics such as strength and toughness. The $Sc_2O_3$ content of less than 3 mol % is not preferable because the crystal phase is mixed with a phase of a monoclinic crystal. As zirconia of a monoclinic crystal exhibits low oxide ion conductivity, it therefore becomes a barrier for ionic conduction, so that the internal resistance of the first solid electrolyte is increased. In addition, the $Sc_2O_3$ content of more than 6 mol % is not preferable because the crystal phase is mixed with a phase of a cubic crystal. Though zirconia of a cubic crystal exhibits high oxide ion conductivity, it is not excellent in the mechanical characteristics such as strength and toughness, so that reliability of the single cell as a structure is lowered. The $Sc_2O_3$ content is more preferably 3.5 to 5 mol %.

On the other hand, the $Al_2O_3$ content dispersed in the parent phase of ScSZ is preferably 0.5 to 5 wt % with respect to the above-mentioned ScSZ containing the predetermined amount of $Sc_2O_3$ mentioned above. This is because, if the $Al_2O_3$ content is within that range, a balance between the oxide ion conductivity and the mechanical characteristics becomes especially excellent. The $Al_2O_3$ content of less than 0.5 wt % is not preferable because the mechanical characteristics such as strength and toughness tend to be insufficient. In addition, the $Al_2O_3$ content of more than 5 wt % is not preferable because a reduction ratio in the oxide ion conductivity is high. Specifically, ScSZ of a tetragonal crystal being the parent phase is excellent in the mechanical characteristics such as strength and toughness; however, it exhibits low oxide ion conductivity compared to ScSZ of a cubic crystal. Therefore, a large amount of $Al_2O_3$ being contained in ScSZ of a tetragonal crystal is not preferable because practicality as a solid electrolyte is lost.

In the foregoing, $Al_2O_3$ dispersed in the ScSZ parent phase preferably exists mainly in grain boundaries being a bonding surface of an ScSZ granule. In the case of the zirconia-based parent phase, as a pure zirconia single crystal exhibits the highest oxide ion conductivity, if $Al_2O_3$ exists in the grain boundaries, the oxide ion conductivity of the ScSZ granule itself is not greatly impaired, and the mechanical characteristics such as strength and toughness can be further improved.

In this case, if $Al_2O_3$ is solubilized in ScSZ, i.e. if Al of which ion radius is greatly different from that of Zr or Sc (ion radius: $Zr^{4+}=0.80$, $Sc^{3+}=0.81$, $Al^{3+}=0.50$, all in 0.1 nm unit) is solubilized in ScSZ, reduction in the oxide ion conductivity becomes great, and improvement in strength cannot be expected. Therefore, the first solid electrolyte does not bear practical use and is not preferable. In addition, if $Al_2O_3$ exists within the ScSZ granule, i.e. if $Al_2O_3$ is integrated by the ScSZ granule, reduction in the oxide ion conductivity becomes great. Therefore, the first solid electrolyte does not bear practical use and is not preferable.

In addition, in the foregoing, the first solid electrolyte, after being sintered to be a sintered body, is preferably provided with surface treatment on its surface to be made rough. A contact area of the first solid electrolyte with the electrodes bonded to the both sides of the first solid electrolyte is thereby expanded, so that adhesion between the first solid electrolyte and both the electrodes is improved, and the generating performance is improved by an increase in the area of the triple phase boundary of the first electrolyte, the electrodes and the gas phase.

As for surface treatment means employed here, sandblast treatment, polishing with an abrasive such as alumina, or the like are mentioned as suitable examples. If the surface treatment is provided for the first solid electrolyte mainly containing zirconia of a tetragonal crystal as a crystal phase, the sandblast treatment is preferably employed.

The reason why the sandblast treatment is preferably employed is described below. If a blast granule collides against the surface of the first solid electrolyte, stress-induced transformation is generated to make phase transition of the crystal phase of a tetragonal crystal to that of a monoclinic crystal. The volumetric expansion resulted therefrom produces compressive residual stress on the surface of the first solid electrolyte, so that there are such advantages that apparent strength of the sintered body is increased and that handling or the like at the time of preparation of cells or the like is facilitated to improve yield. In addition, there is also an advantage that the generating performance is stabilized by removing impurities from the surface of the first solid electrolyte at the time of the sandblast treatment. Besides, though zirconia of a monoclinic crystal with low oxide ion conductivity is generated by the sandblast treatment, since the phase transition of the monoclinic crystal to the tetragonal crystal takes place again during a later electrode-sintering process, the cell performance is slightly affected detrimentally.

Incidentally, JIS B0601 provides an Ra value and an S value for indicators of surface roughness. As for the surface roughness of the first solid electrolyte, the Ra value is preferably greater than or equal to 0.075, and the S value is preferably smaller than or equal to 16. The Ra value smaller than 0.075 and the S value greater than 16 are not preferable because the effect of improvement in the generating performance tends to be little.

Next, the fuel electrode will be described. For the fuel electrode, the cermet of the catalyst and the second solid electrolyte showing high oxide ion conductivity is used. The mixture ratio of the catalyst to the second solid electrolyte is preferably be within a range of Catalyst: Second Solid Electrolyte=30:70 wt % to 70:30 wt %. The ratio out of that range is not preferable because electric conductivity or catalyst activity are lowered, so that the electrode performance is lowered or a coefficient of thermal expansion equivalent becomes great, and a warp is generated in the cells. More preferably, the ratio is within a range of Catalyst Second Solid Electrolyte=40:60 wt % to 60:40 wt %.

As for the catalyst constituting one part of the cermet, Ni, Co, Ru and the like are concretely mentioned as suitable examples. Ni is preferably used because Ni is less expensive than the other metals, and its reaction with the fuel gas such as hydrogen is fully high.

Further, as for the second solid electrolyte constituting the other part of the cermet, that of which the oxide ion conductivity at 1000° C. is 0.20 S/cm or more is used. If the second solid electrolyte with high oxide ion conductivity is used, more oxide ions are provided to the triple phase boundary of the fuel electrode, and the cell reaction is stimulated to improve the electrode activity of the fuel electrode. For further improving the electrode activity of the fuel electrode, the second solid electrolyte in which the oxide ion conductivity at 1000° C. is 0.25 S/cm or more is particularly preferred.

As for the second solid electrolyte satisfying those conditions, ScSZ containing a predetermined amount of $Sc_2O_3$ is mentioned as a suitable example. The $Sc_2O_3$ content of ScSZ is preferably 9 to 12 mol %. The $Sc_2O_3$ content of less than 9 mol % is not preferable because the oxide ion conductivity of the fuel electrode is lowered. In addition, the $Sc_2O_3$ content of more than 12 mol % is not preferable because the oxide ion conductivity of the fuel electrode is lowered as well. The $Sc_2O_3$ content is more preferably 10 to 11 mol %.

In addition, the second solid electrolyte may be ScSZ containing only the predetermined amount of $Sc_2O_3$. However, a slight amount of $CeO_2$ and/or $Y_2O_3$ may be further added to ScSZ. In a case where $CeO_2$ is further added to the above-mentioned ScSZ, the $CeO_2$ content is preferably less than 2 mol %. The $CeO_2$ content of more than 2 mol % is not preferable because the oxide ion conductivity of the fuel electrode is lowered. The $CeO_2$ content is more preferably 0.5 to 1 mol %.

Further, in a case where $Y_2O_3$ is further added to ScSZ, the $Y_2O_3$ content is preferably less than 2 mol %. The $Y_2O_3$ content more than 2 mol % is not preferable because the oxide ion conductivity of the fuel electrode is lowered. The $Y_2O_3$ content is more preferably 0.5 to 1 mol %.

Furthermore, in a case where $CeO_2$ and $Y_2O_3$ are further added to ScSZ, the $CeO_2$ and $Y_2O_3$ content is preferably less than 2 mol % in total. Besides, it is preferable that the crystal phase of the second solid electrolyte is mainly the phase of a cubic crystal.

Next, the fuel electrode contact layer will be described. The fuel electrode contact layer is for bridging a gap generated between the fuel electrode and a separator to improve the adhesion between them, thereby decreasing contact resistance and improving current collecting efficiency. In view of achieving those purposes, a fuel electrode contact material containing metal fine particles is used for the fuel electrode contact layer.

As for the fuel electrode contact material, slurry containing at least the metal fine particles and a binder is concretely mentioned as a suitable example. If the fuel electrode contact layer is comprised of that material, there are such advantages that, even if the material of the separator brought into contact with the fuel electrode contact layer is either of metal/alloy base or ceramic base, it may be used without any problem. As for the metal fine particles, Ni fine particles, Pt fine particles, or Ru fine particles are mentioned as suitable examples. Ni fine particles are preferably used. As Ni is comparatively inexpensive, the object of the fuel electrode contact layer mentioned above is fully achieved while the cost of manufacturing the single cell and the SOFC is suppressed.

At this time, the particle size of the metal fine particles is not specifically limited and is determined in accordance with the kind of the separator brought into contact with the fuel electrode contact layer, the surface condition of that layer or the like. Besides, it is not preferable that the particle size of the metal particles is too small with respect to the gap generated between the fuel electrode and the separator, because the gap is not bridged, and the adhesion between them is not improved, so that the improvement in the current collecting efficiency is not attained. Further, it is not preferable that the particle size of the metal particles is too large, because a gap is caused by a warp, and the adhesion between them is not improved, so that the improvement in the current collecting efficiency is not attained.

Moreover, as for the solvent at the time of preparing slurry, an organic solvent or a water solvent is used. Preferably, the organic solvent is used because of its excellence in the coating property when the slurry is painted by the screen printing method and other methods.

When the organic solvent is used as the solvent, for the binder, polyethylene glycol, polyvinyl butyral, polyethylene, polymethyl methacrylate and the like are mentioned. In addition, as required for control of the viscosity of slurry or the like, a plasticizer such as dimethyl phthalate, dibutyl phthalate and butyl benzyl phthalate, or a dispersant such as fatty acid and benzene sulfonic acid may be mixed therein.

On the other hand, when the water solvent is used as the solvent, for the binder, polyvinyl alcohol, methylcellulose and the like are mentioned. Likewise, as required, a plasticizer such as dibutyl phthalate, glycerine and ethyl toluenesulfonate, or a dispersant such as phosphoric acid glass and allyl sulfonic acid may be mixed therein.

Next, the air electrode will be described. The compound of perovskite type transition metal oxide with the third solid electrolyte is used as the air electrode. When compared with the case of using only perovskite type transition metal oxide, among the electric conductivity and the oxide ion conductivity being characteristics necessary for the air electrode, the oxide ion conductivity is improved, and the oxide ion generated at the air electrode is easily shifted from the air electrode to the first solid electrolyte to improve the electrode activity of the air electrode.

The mixture ratio of perovskite type transition metal oxide to the third solid electrolyte is preferably in a range of Perovskite Type Transition Metal Oxide:Third Solid Electrolyte=90:10 wt % to 70:30 wt %. The ratio out of that range is not preferable because catalyst activity is lowered and deviation in a coefficient of thermal expansion equivalent becomes great. The ratio is more preferably in a range of Perovskite Type Transition Metal Oxide:Third Solid Electrolyte=90:10 wt % to 80:20 wt %.

For perovskite type transition metal oxide constituting one part of the air electrode, specifically, $La_{1-x}Sr_xMnO_3$ (wherein $0.1 \leq x \leq 0.5$), $Pr_{1-x}Sr_xMnO_3$ (wherein $0.1 \leq x \leq 0.5$), $La_{1-x}Sr_xCo_{1-y}Fe_yO_3$ (wherein $0.1 \leq x \leq 0.5$, $1 \leq y \leq 0.5$) and the like are mentioned as suitable examples.

Incidentally, in those composition formulae, the atomic ratio of oxygen is indicated as 3. However, as clearly understood by those skilled in the art, for example, if the atomic ratio x(y) is not 0, an oxygen vacancy is generated. Therefore, in reality, the atomic ratio of oxygen is often a smaller value than 3. However, since the number of the oxygen vacancy is varied also according to the kind of an element added or a manufacturing condition, the atomic ratio of oxygen is indicated as 3 for convenience.

Besides, for the third solid electrolyte constituting the other part of the air electrode, YSZ, ScSZ and the like are specifically mentioned as suitable examples. If YSZ is employed for the third solid electrolyte, the $Y_2O_3$ content of YSZ is preferably 8 to 10 mol %. The $Y_2O_3$ content is more preferably 8 to 9 mol %. Besides, if ScSZ is used as the third solid electrolyte, the $Sc_2O_3$ content of ScSZ is preferably 9 to 12 mol %. The $Sc_2O_3$ content is more preferably 10 to 11 mol %.

Next, the explanation will be given on the air electrode contact layer. The layer is for reducing resistance in the direction of the plane of the first solid electrolyte to prevent the cell performance from degrading along with upsizing of the cell and for bridging a gap generated between the air electrode and the separator brought into contact therewith to improve the adhesion between them, thereby reducing the contact resistance and improving the current collecting efficiency. In addition, that layer has a role of containing the aqueous solution where a water-soluble noble metal compound is dissolved in water which is impregnated into the air electrode (described later), for not leaking the solution outside. In view of achieving those objects, used as the air electrode contact layer is the air electrode contact material containing materials of which the electric conductivity is higher than that of the air electrode material in the temperature region for power generation. Incidentally, the temperature region for power generation is a temperature range of 600 to 1000° C.

For the air electrode contact material, slurry containing at least a $La_{1-x}Sr_xCoO_3$ (wherein $0.1 \leqq x \leqq 0.5$) powder and a binder is mentioned as a suitable example. For a solvent at the time of preparing the slurry, an organic solvent or a water solvent is used. The organic solvent is preferably used because its coating property when the slurry is painted by the screen printing method and other methods is excellent.

When the organic solvent is used as the solvent, for the binder, polyethylene glycol, polyvinyl butyral, polyethylene, polymethyl methacrylate and the like are mentioned. In addition, as required for control of the viscosity of slurry or the like, a plasticizer such as dimethyl phthalate, dibutyl phthalate and butyl benzyl phthalate, or a dispersant such as fatty acid and benzene sulfonic acid may be mixed therein.

On the other hand, when the water solvent is used as the solvent, for the binder, polyvinyl alcohol, methylcellulose and the like are mentioned. Likewise, when the occasion arises, a plasticizer such as dibutyl phthalate, glycerine and ethyl toluenesulfonate, or a dispersant such as phosphoric acid glass and sulfonic acid allyl are mixed therein.

Next, the explanation will be given on the aqueous solution where a water-soluble noble metal compound is dissolved in water which is impregnated into the air electrode (mentioned as a "co-catalyst solution" hereinafter). The co-catalyst solution is previously impregnated into the air electrode in order to accelerate ionization of oxygen molecule provided to the air electrode. The amount of the co-catalyst solution impregnated into the air electrode is preferably 0.05 $mg/cm^2$ or more when converted to noble metal weight, and the amount is more preferably 0.1 $mg/cm^2$ or more.

If the co-catalyst solution is previously impregnated into the air electrode, when the single cell and the SOFC are heated upon operation, an organic component in the co-catalyst solution is evaporated, and the noble metal is supported on the surface of the vacancy in the air electrode being a porous body. Therefore, the noble metal supported acts as a co-catalyst, and the electrode activity of the air electrode is further promoted.

As for a noble metal compound dissolved in the above-mentioned co-catalyst solution, a water-soluble one is suitably used. A water-insoluble one may also be available. However, if the water-soluble one is used, there are many advantages like that, since water can be used as a dissolution for the solution, it becomes easy to handle at the time of manufacturing the single cell and the SOFC or to perform after-treatment of waste liquid and the like.

For the water-soluble noble metal compound, a water-soluble palladium compound, a water-soluble platinum compound, a water-soluble rhodium compound, a water-soluble ruthenium compound and the like are specifically mentioned as suitable examples. Preferably, the water-soluble palladium compound is used because palladium is the most excellent in the catalyst activity when combined with the electrode material.

More specifically, for the water-soluble palladium compound, $[Pd(NH_3)_4]Cl_2 \cdot xH_2O$ (Tetraamminepalladium (II) chloride hydrate), $[Pd(NH_3)_4]Cl_2$ (Tetraamminepalladium (II) chloride), $Na_2[PdCl_4]$ (Sodium tetrachloropalladium (II)), $Pd(NO)_2$ (Palladium (II) nitrate), $[Pd(NH_3)_4](NO_3)_2$ (Tetraamminepalladium (II) nitrate) and the like are mentioned.

In addition, for the water-soluble platinum compound, $[Pt(NH_3)_4]Cl_2 \cdot xH_2O$ (Tetraammineplatinum (II) chloride hydrate), $[Pt(NH_3)_4]Cl_2$ (Tetraammineplatinum (II) chloride), $K_2[PtCl_4]$ (Potassium tetrachloroplatinate (II)), $H_2[PtCl_6] \cdot xH_2O$ (Hexachloroplatinic (IV) acid hydrate), $[Pt(NH_3)_4](NO_3)_2$ (Tetraammineplatinum (II) nitrate) and the like are mentioned.

Further, for the water-soluble rhodium compound, $RhCl_3 \cdot xH_2O$ (Rhodium (III) chloride hydrate), $Rh(CH_3COO)_3$ (Rhodium (III) acetate), $(NH_4)_3[RhCl_6] \cdot xH_2O$ (Ammonium hexachlororhodate (III) hydrate), $Rh(NO_3)_3$ (Rhodium (III) nitrate) and the like are mentioned.

Furthermore, for the water-soluble ruthenium compound, $RuCl_3 \cdot xH_2O$ (Ruthenium chloride hydrate), $[Ru(NH_3)_6]Cl_3$ (Hexaammineruthenium (III) chloride) and the like are mentioned.

Next, the explanation will be given on the separator in the SOFC. The separator is for providing a fuel gas and an oxidant gas to the fuel electrode and the air electrode, respectively. Therefore, a gas passage for providing a reaction gas is arranged in the separator. In addition, the separator is also a current collector for taking out electricity obtained by power generation. Therefore, materials used for the separator satisfy such conditions as being stable at the operating temperature, showing high electric conductivity, having gastight quality and the like. For the separator satisfying those conditions, lanthanum-chromium based oxide such as $LaCrO_3$, or metal/alloy based materials are mentioned as suitable examples.

Next, the cell structure will be described. The single cell and the SOFC consistent with the present invention may have any of the cell structures of planar type, tubular type and integral type. Among them, the cell structure of planar type, specifically, of self-standing film type is most suitable for the single cell and the SOFC consistent with the present invention. That is because, in the single cell and the SOFC, the first solid electrolyte excellent in the mechanical characteristics such as strength and toughness is used, and even in a laminated cell structure which imposes load on the first solid electrolyte, efficient reliability may be ensured.

Next, the action of the single cell and the SOFC consistent with one preferred embodiment provided with the above-mentioned constitution will be described.

In the single cell consistent with the present invention, a first solid electrolyte excellent in the oxide ion conductivity and the mechanical characteristics is used. Therefore, in comparison with a single cell for an SOFC in which conventional YSZ, ScSZ or the like is used as the first solid electrolyte, efficient power generation is obtained because of excellence in the oxide ion conductivity, and the single cell is excellent as a structure because of excellence in the mechanical characteristics. In addition, because of the excellent mechanical characteristics, the first solid electrolyte can be thinned, and it thereby becomes possible to improve also the oxide ion conductivity.

Further, in the single cell consistent with the present invention, the fuel electrode is comprised of the cermet of the catalyst and the second solid electrolyte showing high oxide ion conductivity, and the air electrode is comprised of the compound of perovskite type transition metal oxide with the third solid electrolyte. Therefore, more oxide ions ionized at the air electrode are shifted from the air electrode to the first solid electrolyte, and more oxide ions are provided from the first solid electrolyte to the triple phase boundary of the fuel electrode. The single cell consistent with the present invention thereby has high power generation efficiency and is excellent in output stability.

At this time, if the surface of the first solid electrolyte is made rough by the surface treatment, the contact area of the first solid electrolyte with the electrodes brought into contact with both the surfaces thereof is increased, so that the adhesion between the first solid electrolyte and the electrodes is improved and the area of the triple phase boundary of the first solid electrolyte, the electrodes and the gas phase is increased. Therefore, it becomes possible to further improve the power generating performance.

In addition, in the single cell consistent with the present invention, since the aqueous solution where a water-soluble noble metal compound is dissolved in water (the co-catalyst solution) is impregnated into the air electrode, if the single cell is heated at the time of the first operation, the noble metal ion in the co-catalyst solution is supported on the surface of the vacancy in the air electrode as a noble metal. Therefore, the noble metal acts as a co-catalyst, and the ionization of oxygen molecule provided to the air electrode is accelerated. Accordingly, the action of the co-catalyst solution and that of the above-mentioned air and fuel electrodes are combined to enable further improvement in the power generating performance of the single cell.

Incidentally, after the first operation of the single cell consistent with the present invention, in the air electrode, the co-catalyst solution does not exist as a solution, but the noble metal therein exists while being supported on the surface of the vacancy in the air electrode. The single cell in that state is included in the technical scope of the present invention. In addition, in the present application, even when the co-catalyst solution is in a drying-out state after being impregnated into the air electrode, the same action and effect as above can be obtained. Therefore, a single cell for an SOFC in a state that the water-soluble noble metal compound is adhered to the surface of the vacancy in the air-electrode is within the technical scope of the present invention.

Further, in the single cell consistent with the present invention, the surface of the fuel electrode is coated with the fuel electrode contact layer comprised of the fuel electrode contact material containing metal fine particles. Hence, if the single cells are stacked to be the SOFC, a gap generated between the fuel electrode and the separator is bridged by the fuel electrode contact layer. Therefore, the adhesion between the fuel electrode and the separator is enhanced, and the contact resistance is reduced to improve the current collecting efficiency. Accordingly, electricity generated by the single cell can be collected without great loss, and the generating performance of the SOFC is greatly improved.

At this time, if the fuel electrode contact material is slurry containing at least the metal fine particles and the binder, the fuel electrode contact layer is in a non-sintered and soft state. Therefore, a favorable adhesion condition may be obtained between the fuel electrode contact layer and the separator. And then, the SOFC is heated at the time of the first operation while the favorable adhesion condition is maintained, so that microscopic asperities on the separator are absorbed. Therefore, the adhesion between the fuel electrode and the separator is enhanced, and the contact resistance is further reduced to further improve the current collecting efficiency. Accordingly, electricity generated by the single cell can be collected without great loss, so that the generating performance of the SOFC is further improved.

Incidentally, after the first operation of the SOFC consistent with the present invention, the binder and the like being components other than the metal fine particles contained in the fuel electrode contact layer are decomposed by heating and disappear. Therefore, the fuel electrode contact layer is mainly constituted of the metal fine particles. The SOFC in that state is also contained in the technical scope of the present invention.

Further, in the single cell consistent with the present invention, the surface of the air electrode is coated with the air electrode contact layer comprised of the air electrode contact material containing materials with higher electric conductivity in the temperature region for power generation than that of the air electrode material, and the resistance in the direction of the plane of the first solid electrolyte may be reduced. Therefore, degradation in the cell performance associated with upsizing of the cell can be prevented, and the utility of the single cell is enhanced. Further, since the electric conductivity of the air electrode does not affect the cell performance, a degree of flexibility in design of the air electrode (material composition or thickness, porosity and the like) is increased, and the utility of the single cell is enhanced also in this point.

In addition, if the single cells are stacked to be the SOFC via the separator, the gap generated between the air electrode and the separator are bridged by the air electrode contact layer. Therefore, the adhesion between the air electrode and the separator is enhanced, and the contact resistance is reduced to improve the current collecting efficiency. Accordingly, electricity generated by the single cell may be collected without great loss, and the generating performance of the SOFC is improved.

At this time, if the air electrode contact material is slurry containing at least a $La_{1-x}Sr_xCoO_3$ (wherein $0.1 \leq x \leq 0.5$) and the binder, the air electrode contact layer is in a non-sintered and soft state, and a favorable adhesion condition may be obtained between the air electrode contact layer and the separator. If the SOFC is heated at the time of the first operation while the favorable adhesion condition is maintained, microscopic asperities on the separator are absorbed. Besides, the air electrode contact layer shows higher electric conductivity in the temperature region for power generation than that of the air electrode. Therefore, the adhesion between the air electrode and the separator is further enhanced, and the contact resistance is further reduced to further improve the current collecting efficiency. Accordingly, electricity generated by the single cell may be collected without great loss, and the generating performance of the SOFC is further improved.

Incidentally, after the first operation of the SOFC consistent with the present invention, the binder and the like being components other than $La_{1-x}Sr_xCoO_3$ contained in the air electrode contact layer are decomposed by heating and disappear, and the air electrode contact layer is mainly constituted of $La_{1-x}Sr_xCoO_3$. The SOFC in that state is also within the technical scope of the present invention.

As stated above, the single cell consistent with the present invention is excellent in the generating performance, the durability and the like in practical use. Moreover, the interaction caused by the contact of each electrode with the separator when the single cells are stacked is fully taken into consideration. Therefore, the SOFC which is made by stacking a plurality of the single cells via the separator are also excellent in the generating performance, the durability and the like in practical use.

Next, the explanation will be given on a production method of the single cell and the SOFC consistent with the present invention. Firstly, a first solid electrolyte material being a material for the first solid electrolyte is prepared. If the above-mentioned dispersion strengthened solid electrolyte is used as the first solid electrolyte, for example, an ScSZ powder containing a predetermined amount of $Sc_2O_3$ and an $Al_2O_3$ powder are mixed to make a predetermined composition, and the mixture is wet-blended using a ball mill and the like. Then, that mixture is dried out to obtain the dispersion strengthened solid electrolyte material.

At this time, for the $Al_2O_3$ powder, $\alpha$-$Al_2O_3$, $\gamma$-$Al_2O_3$ and the like may be employed. In view of uniformly dispersing $Al_2O_3$ in the grain boundaries after the sintering, $\gamma$-$Al_2O_3$ is preferably used. Since particles of $\gamma$-$Al_2O_3$ are fine, they are easy to grind in the mixing process, and uniformly dispersed in the grain boundaries without inhibiting grain growth in the parent phase at the time of the sintering. In addition, if $\gamma$-$Al_2O_3$ is used, in comparison with the case of using $\alpha$-$Al_2O_3$, a desired strength improvement is achieved in a less amount, and the reduction in the oxide ion conductivity may be suppressed at lower. level.

Next, the first solid electrolyte material obtained is molded in a predetermined shape, and sintered at a predetermined temperature to prepare the first solid electrolyte being a sintered body. As for the molding method, optimum methods may be employed in accordance with the cell structures of the single cell and the SOFC. For example, for molding in a plate shape, the tape casting method, the press molding method and the like may be employed. Further, for molding in a tubular or honeycomb shape, the extrusion molding method, the injection molding method and the like may be employed. In this case, the thickness of the first solid electrolyte material is preferably within 50 to 300 µm because, if less than 50 µm, the reliability as a structure tends to decrease, and if more than 300 µm, the internal resistance becomes great, and the oxide ion conductivity tends to decrease. The thickness is more preferably within 100 to 200 µm.

In addition, for a sintering condition for a molded body, an optimum temperature is selected in accordance with its composition, a crystal phase after the sintering and the like. For example, if a molded body comprised of the above-mentioned dispersion strengthened solid electrolyte material is sintered, the sintering temperature is preferably within 1300 to 1400° C. If the sintering temperature is less than 1300° C., the oxide ion conductivity of the sintered body tends to decrease, and if more than 1400° C., a phase of a monoclinic crystal is generated in the crystal phase, and the crystal particles become large, so that predetermined mechanical characteristics tend to be not obtained. The sintering temperature is more preferably within 1350 to 1400° C.

Next, the surface treatment is provided to the surface of the first solid electrolyte as occasion arises. If the surface treatment is provided using the surface treatment means such as sandblast treatment and polishing, it is preferable to optimize conditions in order that cracks are not generated on the first solid electrolyte due to injection pressure of blast granules, the abrasive and the like, and to provide masking and the like to the edge portion of the first solid electrolyte for preventing generation of cracks.

Next, on one side of the first solid electrolyte, slurry containing a catalyst material and the second solid electrolyte material mixed at a predetermined ratio is painted, and the slurry is sintered at a predetermined temperature to bond the fuel electrode. In this case, the thickness of the fuel electrode is preferably within 10 to 50 µm, more preferably 20 to 30 µm.

As above, on the other side of the first solid electrolyte, slurry containing perovskite type transition metal oxide and the third solid electrolyte material mixed at a predetermined ratio is painted, and the slurry is sintered at a predetermined temperature to bond the air electrode. In this case, the thickness of the air electrode is preferably within 10 to 50 µm, more preferably 20 to 30 µm.

Incidentally, for the painting method for the fuel electrode and the air electrode, the screen printing method, the doctor blade method, the brushing method, the spray method, the dipping method and the like are concretely mentioned as suitable examples. However, the present invention is not limited thereto.

Next, the fuel electrode contact material containing the metal fine particles is painted on the fuel electrode to form the fuel electrode contact layer. In this case, the thickness of the fuel electrode contact layer is preferably within 10 to 50 µm, more preferably 20 to 30 µm. In addition, as for the forming method, the screen printing method, the doctor blade method, the brushing method, the spray method and the like are specifically mentioned as suitable examples. However, the present invention is not limited thereto.

If the slurry containing at least the metal fine particles and the binder is used as the fuel electrode contact material, it is preferable to previously paint the same binder as the binder in the slurry on the fuel electrode by the brushing method, the spray method or the like, and to form the fuel electrode contact layer thereafter. If the fuel electrode contact layer is formed on the fuel electrode without such pretreatment, since the fuel electrode is porous, the slurry is absorbed in the vacancy, and the fuel electrode contact layer may not be uniformly formed on the fuel electrode.

Next, the aqueous solution where a water-soluble noble metal compound is dissolved in water (the co-catalyst solution) is impregnated into the air electrode. For the impregnation method of the co-catalyst solution, the brushing method, the spray method and the like are specifically mentioned as suitable examples. However, the present invention is not limited thereto. Further, after the co-catalyst solution is impregnated into the air electrode, residual water may be evaporated using a dryer and the like. The drying temperature in that case may be in the order of 80 to 95° C.

Next, the air electrode contact material containing material with higher electronic conductivity in the temperature region for power generation than that of the air electrode material is painted on the air electrode to form the air electrode contact layer. In this case, the thickness of the air electrode contact layer is preferably within 10 to 50 µm, more preferably 20 to 30 µm. In addition, for the forming method, the screen printing method, the doctor blade method, the brushing method, the spray method and the like are specifically mentioned as suitable examples. However, the present invention is not limited thereto.

If the slurry containing at least the $La_{1-x}Sr_xCoO_3$ (wherein $0.1 \leq x \leq 0.5$) powder and the binder is used as the air electrode contact material, it is preferable to previously paint the same binder as that in the slurry on the air electrode by the brushing method, the spray method and the like, and to form the air electrode contact layer thereafter. If the air electrode contact layer is formed on the air electrode without such pretreatment, since the air electrode is porous, the slurry is absorbed in the vacancy, and the air electrode contact layer may not be uniformly formed on the air electrode.

According to the above-description, the single cell consistent with the present invention may be obtained. Further, if the single cell is attached with fuel gas supplying means, oxidant gas supplying means and the like, power generation can be performed. Furthermore, the single cells thus obtained are stacked via the separator, and the SOFC is obtained. If the SOFC is attached with fuel gas supplying means and oxidant gas supplying means, power generation can be performed.

EXAMPLE (Oxide Ion Conductivity, Mechanical Characteristics of First Solid Electrolyte, and its Crystal Phase)

Firstly, in order that 0.5 wt % $Al_2O_3$ would be contained with respect to ScSZ containing 4 mol % $Sc_2O_3$ (referred to as "4ScSZ" hereinafter), a 4ScSZ material and an $Al_2O_3$ powder were weighed, respectively, and ethyl alcohol was added therein, and then the mixture was wet-blended with a ball mill (using a $ZrO_2$cobble). Then, the liquid mixture was heated and dried while being stirred to obtain the dispersion strengthened solid electrolyte material as the first solid electrolyte material. Incidentally, a 4ScSZ material made by DAIICHI KIGENSO KAGAKU KOGYO CO., LTD., and an $Al_2O_3$ powder made by TAIMEI CHEMICALS CO., LTD. were used here.

Next, the dispersion strengthened solid electrolyte material was molded by uniaxial die-pressing at the molding pressure of 1000 $kgf/cm^2$. Then, the molded body was sintered for two hours at the sintering temperature of 1400° C. to prepare a dispersion strengthened solid electrolyte sintered body (referred to as a "4ScSZ0.5A sintered body" hereinafter). Besides, as a comparison, a 4ScSZ sintered body prepared by the same procedure except for that $Al_2O_3$ was not added was used.

Next, the 4ScSZ0.5A sintered body obtained and the 4ScSZ sintered body were measured for the oxide ion conductivity at 1000° C. and for a three-point bending strength at ambient temperature. In addition, XRD patterns of the 4ScSZ0.5A sintered body and the 4ScSZ sintered body were obtained to measure their, crystal phases.

Incidentally, in the measurement of the oxide ion conductivity, a sample bar of each sintered body (20 mm×3 mm×4 mm) on which a platinum paste was sintered at 1000° C. was used as an electrode and was measured at 1000° C. The measurement was performed by the alternating current impedance method (frequency of 100 to 10 MHz, in static air). From a resistance value and a size of the bar, the oxide ion conductivity was obtained according to the following formula.

Oxide ion conductivity σ (S/cm)=(1/Resistance value $R(\Omega)$)×Length of Sample Bar L(cm)/Cross-Sectional Area of Sample Bar S($cm^2$)     [Formula 1]

In addition, the measurement for the three-point bending strength was performed according to JIS R1601 "Testing method for Bending Strength of Fine Ceramics". The three-point bending test was performed on a sample bar in a prism shape of 3 mm(B)×4 mm(W)×40 mm(L) at ambient temperature.

Table 1 provides the oxide ion conductivity at 1000° C. and the three-point bending strength at ambient temperature of each sintered body, and its crystal phase.

TABLE 1

| Sintered Body | Oxide Ion Conductivity (S/cm) 1000° C. | Three-point Bending Strength (MPa) | Crystal Phase |
| --- | --- | --- | --- |
| 4ScSZ0.5A | 0.09 | 1000 | Tetragonal Crystal |
| 4ScSZ | 0.10 | 650 | Tetragonal Crystal |

According to Table 1, in the case of the 4ScSZ sintered body, the oxide ion conductivity at 1000° C. was 0.10 S/cm, and the three-point bending strength was 650 MPa. On the other hand, in the case of the 4ScSZ0.5A sintered body, the oxide ion conductivity at 1000° C. was 0.09 S/cm, and the three-point bending strength was 1000 MPa. As a consequence, it was apparent that the 4ScSZ0.5A sintered body was far superior in the oxide ion conductivity and the mechanical strength. Further, the crystal phase of each sintered body was the tetragonal crystal.

(Oxide Ion Conductivity of the Second Solid Electrolyte, and its Crystal Phase)

Next, for the second solid electrolyte constituting one part of the fuel electrode, an ScSZ material containing 11 mol % $Sc_2O_3$ (referred to as "11ScSZ" hereinafter), an ScSZ material containing 10 mol % $Sc_2O_3$ and 1 mol % $CeO_2$ (referred to as "10Sc1CeSZ" hereinafter), an ScSZ material containing 10 mol % $Sc_2O_3$ and 1 mol % $Y_2O_3$ (referred to as "10Sc1YSZ" hereinafter) were used to prepare an 11ScSZ sintered body, a 10Sc1CeSZ sintered body, and a 10Sc1YSZ sintered body, respectively. And, the sintered bodies were measured for the oxide ion conductivity at 1000° C. and their crystal phases. Additionally, an 8YSZ sintered body was used as a comparison.

Incidentally, as the 11ScSZ and 10ScSZ materials, those made by DAIICHI KIGENSO KAGAKU KOGYO CO., LTD. were used. The 10Sc1CeSZ and 10Sc1YSZ materials were prepared by blending a predetermined amount of $CeO_2$ and $Y_2O_3$ into the 10ScSZ material to be calcinated and then grinded. On the other hand, for the 8YSZ material, that made by TOSOH CORPORATION was used.

Table 2 provides the oxide ion conductivity at 1000° C. of each sintered body, and its crystal phase.

TABLE 2

| Composition | Oxide Ion Conductivity (S/cm) 1000° C. | Crystal Phase |
| --- | --- | --- |
| 11 mol % $Sc_2O_3$-89 mol % $ZrO_2$ (11ScSZ) | 0.310 | Cubic Crystal |
| 10 mol % $Sc_2O_3$-1 mol % $CeO_2$-89 mol % $ZrO_2$ (10Sc1CeSZ) | 0.343 | Cubic Crystal |
| 10 mol % $Sc_2O_3$-1 mol % $Y_2O_3$-89 mol % $ZrO_2$ (10Sc1YSZ) | 0.304 | Cubic Crystal |
| 8 mol % $Y_2O_3$-92 mol % $ZrO_2$ (8YSZ) | 0.160 | Cubic Crystal |

According to Table 2, in the case of the 8YSZ sintered body, the oxide ion conductivity at 1000° C. was 0.16 S/cm. On the other hand, in the case of the 11ScSZ sintered body, the oxide ion conductivity at 1000° c was 0.31 S/cm, which was higher than that of the 8YSZ sintered body. In a like manner, in the case of the 10Sc1CeSZ sintered body, the oxide ion conductivity at 1000° C. was 0.343 S/cm, and in the case of the 10Sc1YSZ sintered body, the oxide ion conductivity at 1000° C. was 0.304 S/cm. Besides, the crystal phase of each sintered body was the cubic crystal.

(Preparation of Single Cell)

Next, in accordance with the following procedure, the single cell was prepared. Firstly, the binder was added to the above-mentioned dispersion strengthened solid electrolyte material to make slurry, and a green sheet of which thickness was about 150 μm was prepared by the tape casting method. Subsequently, based on the results provided by Tables 1 and 2 shown above, the green sheet was sintered at 1350° C. for two hours to prepare a solid electrolyte plate.

Then, the sandblast treatment was provided to the surface of the solid electrolyte plate to have roughness of the Ra value being 0.075 or more and the S value being 16 or less.

Next, NiO (made by NACALAI TESQUE, INC.) and 10Sc1CeSZ mentioned above were weighed at the weight ratio of NiO:10Sc1CeSZ=4:6 where they are converted to Ni and $ZrO_2$, and then mixed for 24 hours using the ball mill and dried. Then, slurry was made by adding a binder (polyethylene glycol) to the fuel electrode material, and it was painted (thickness of about 40 μm) on one surface of the solid electrolyte plate by the screen printing method. Subsequently, the slurry was sintered for two hours at 1350° C. to make a fuel electrode. Incidentally, NiO is reduced to be Ni when provided with hydrogen at the time of power generation, and acts as a catalyst.

Next, $La_{0.8}Sr_{0.2}MnO_3$ (made by SEIMI CHEMICAL CO., LTD.) (referred to as "LSM" hereinafter) and 8YSZ mentioned above were weighed at the weight ratio of $La_{0.8}Sr_{0.2}MnO_3$:8YSZ=8:2, and mixed for 24 hours using the ball mill, and dried. Then, slurry was made by adding a binder (polyethylene glycol) to the air electrode material, and the slurry was painted (thickness of about 50 μm) on the other surface of the solid electrolyte plate by the screen printing method. Subsequently, the slurry was sintered at 1150° C. for two hours to make an air electrode.

Then, slurry was prepared by adding a binder (polyethylene glycol) to Ni fine particles (made by IHARA TEC EXIMPORT CO., LTD.). Subsequently, the same binder (polyethylene glycol) as that in the slurry was previously impregnated into the fuel electrode by the brushing method, and that slurry was painted on the surface of the fuel electrode by the screen printing method to form a fuel electrode contact layer of which thickness is about 15 μm.

Next, a solution of $[Pd(NH_3)_4]Cl_2 \cdot xH_2O$ (Tetraamminepalladium (II) chloride hydrate) dissolved in ion-exchanged water was prepared (referred to as "Pd co-catalyst solution" hereinafter). Subsequently, the Pd co-catalyst solution was impregnated into the air electrode by the brushing method, then water was removed by keeping still standing in the dryer maintained at 95° C. At this time, the impregnation amount of the Pd co-catalyst solution was 0.1 mg/cm² where the solution was converted to Pd weight. Incidentally, the organic component of $[Pd(NH_3)_4]Cl_2 \cdot xH_2O$ evaporates by heating at the time of power generation.

Then, a binder (polyethylene glycol) was added to an $La_{0.8}Sr_{0.2}CoO_3$ powder (made by SEIMI CHEMICAL CO., LTD.) to prepare slurry. Subsequently, the same binder (polyethylene glycol) as that in the slurry was previously impregnated into the air electrode by the brushing method, then the above-mentioned slurry was painted on the surface of the air electrode by the screen printing method to form an air electrode contact layer of which thickness is about 25 μm.

By those methods, a single cell 6 for an SOFC was made to have a five-layered structure; a fuel electrode contact layer 1, a fuel electrode 2, a solid electrolyte plate 3, an air electrode 4, and an air electrode contact layer, as shown in FIG. 1.

Then, as a comparison, a single cell for an SOFC was prepared following the same procedure as that of the above-mentioned single cell except for that 8YSZ was used instead of 10Sc1CeSZ as the fuel electrode material. In addition, another single cell was prepared following the same procedure except for that the Pd co-catalyst solution was not impregnated into the air electrode. Further, still another single cell was prepared following the same procedure except for that the sandblast treatment was not provided to the solid electrolyte plate. Furthermore, another single cell was prepared following the same procedure except for that the fuel electrode contact layer was not formed.

(Generating Test)

Figure 2:
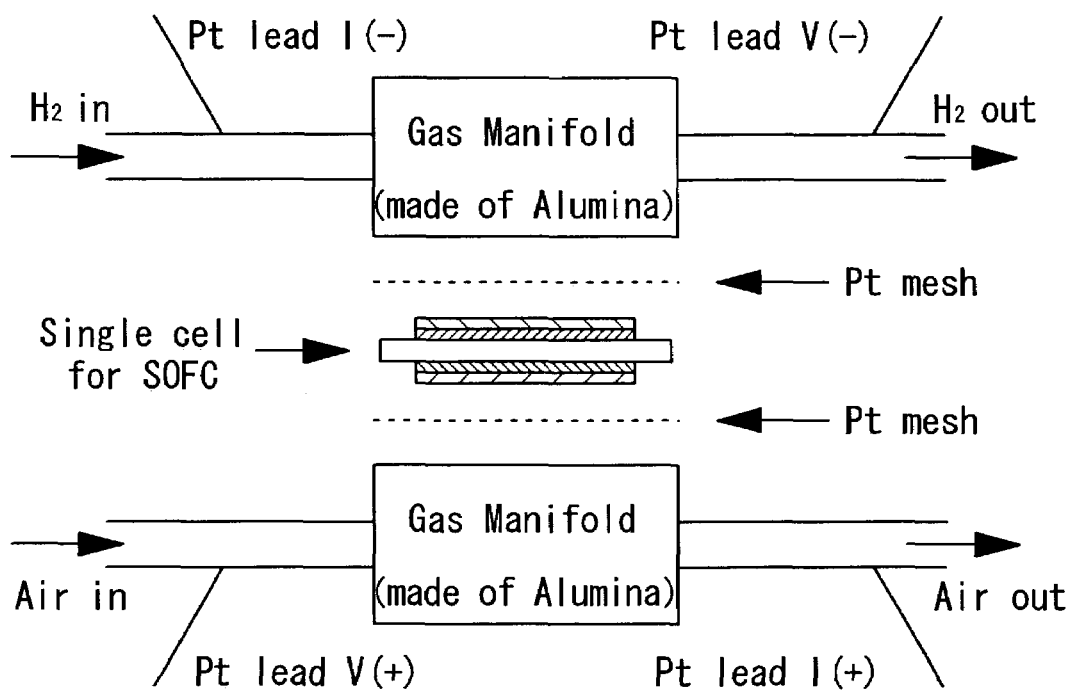
FIG. 2 is a schematic diagram of a device for a power generating test.

Next, a generating test was performed using each single cell obtained as above. As shown in FIG. 2, both sides of the single cell, i.e. the fuel electrode contact layer side and the air electrode contact layer side, were sandwiched between Pt meshes, and gas manifolds (made of alumina) were provided on the outer sides of the Pt meshes, and then the fuel gas ($H_2$) and the oxidant gas (Air) were provided therein. Incidentally, the power generation temperature was 950° C., and the fuel gas was humidified at the humidity of 3% via a bubbler humidified by an oil bath.

Figure 3:
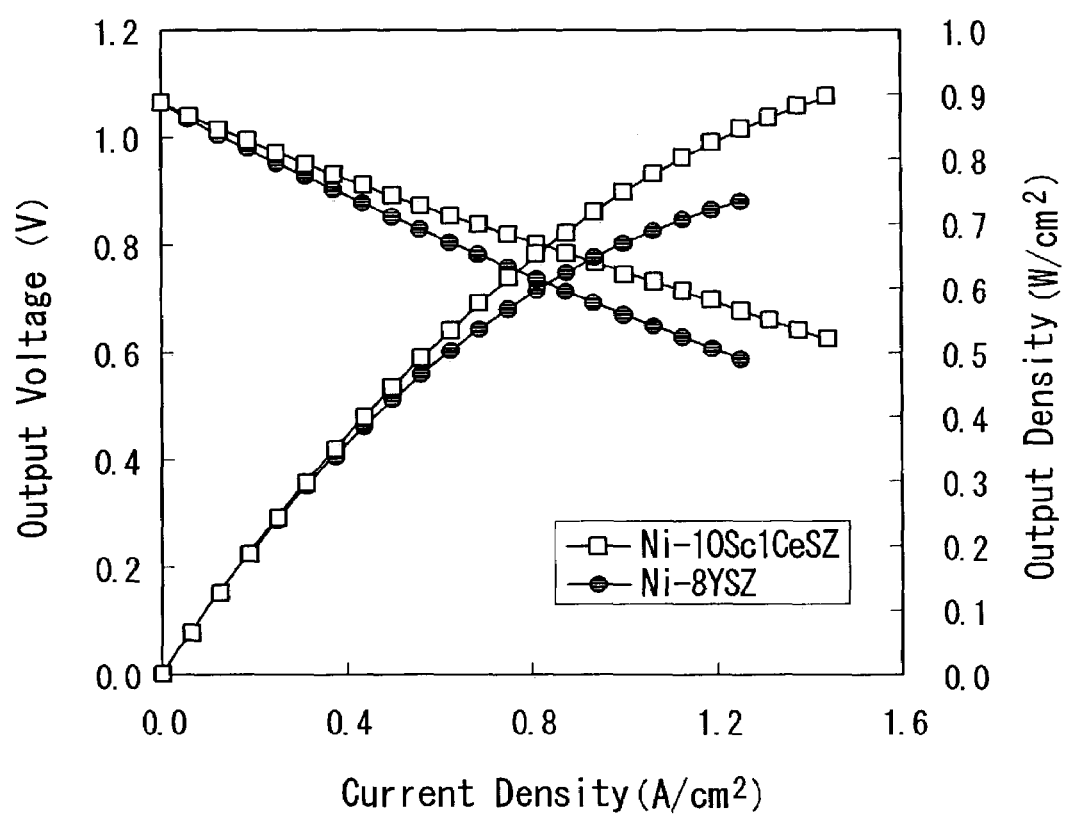
FIG. 3 is a graph showing a relationship of current density with output voltage and output density in the case of using a Ni-10Sc1CeSZ cermet as a fuel electrode and that in the case of using a Ni-8YSZ cermet.

FIG. 3 shows a relationship of the current density with the output voltage and the output density in the case of using the Ni-10Sc1CeSZ cermet as the fuel electrode and that in the case of using the Ni-8YSZ cermet as that electrode. FIG. 3 indicates that the generating performance when the Ni-10Sc1CeSZ cermet was used is more excellent than when the Ni-8YSZ cermet was used. This is because the fuel electrode comprised of the Ni-10Sc1CeSZ cermet had excellent electrode activity. In addition, as for an initial degradation property after the generating test lasting several tens of hours, degradation was less in the case of using the Ni-10Sc1CeSZ cermet.

Figure 4:
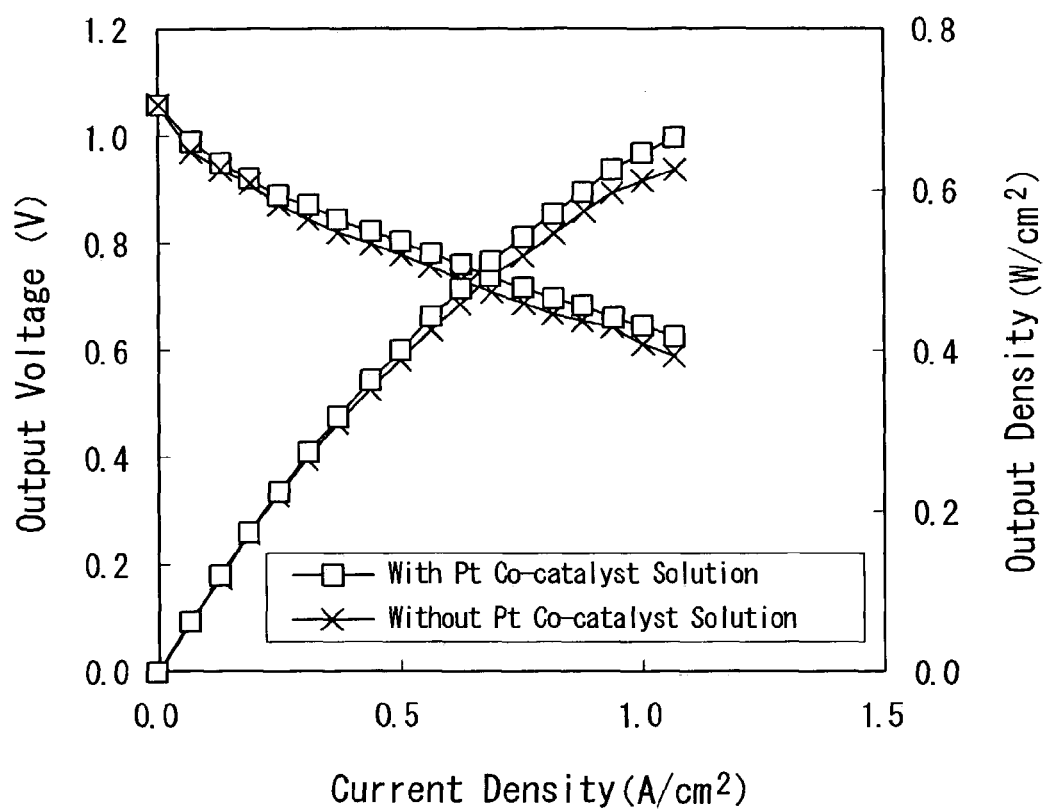
FIG. 4 is a graph showing a relationship of current density with output voltage and output density in a case where a Pd co-catalyst solution is impregnated into the air electrode and that in a case where the solution is not impregnated thereinto.

In addition, FIG. 4 shows a relationship of the current density with the output voltage and the output density in a case where the Pd co-catalyst solution was impregnated into the air electrode and that in a case where the solution was not impregnated thereinto. FIG. 4 indicates that the generating performance when the Pd co-catalyst solution was impregnated into the air electrode was more excellent than that when it was not impregnated thereinto. This is because Pd acted as a co-catalyst and the electrode activity of the air electrode was further increased.

Figure 5:
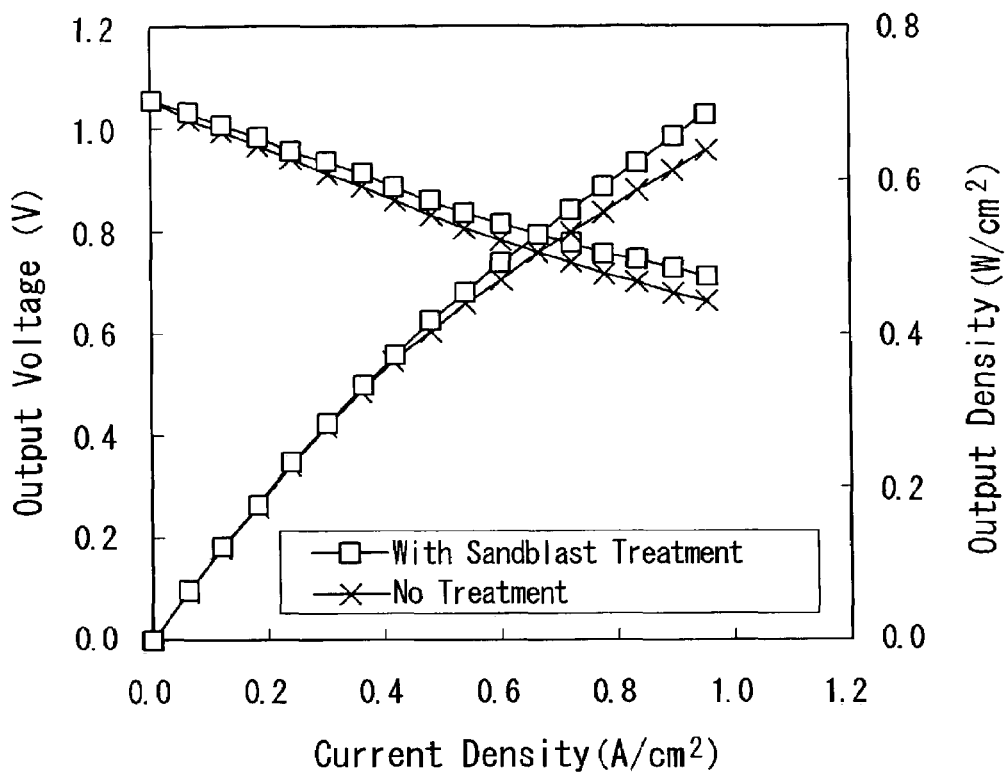
FIG. 5 is a graph showing a relationship of current density with output voltage and output density in a case where sandblast treatment is provided to a surface of a solid electrolyte plate and that in a case where the treatment is not provided thereto.

FIG. 5 shows a relationship of the current density with the output voltage and the output density in a case where the sandblast treatment was provided to the surface of the solid electrolyte plate and that in a case where the treatment was not provided thereto. FIG. 5 indicates that the generating performance when the sandblast treatment was provided was more excellent than that when it was not provided. This is because the contact area with the both electrodes was increased by the sandblast treatment, and adhesion between both the electrodes and the solid electrolyte plate was improved and the triple phase boundary of the solid electrolyte plate, the both electrodes and the gas phase was increased. In addition, it was confirmed that the sandblast treatment produced an effect of stabilizing the generating performance resulted from impurities being removed from the surface of the solid electrolyte plate. Incidentally, as apparent from the results of Example, even if the solid electrolyte plate with the crystal phase being the tetragonal crystal was provided with the sandblast treatment, the cell performance was not adversely affected.

Figure 6:
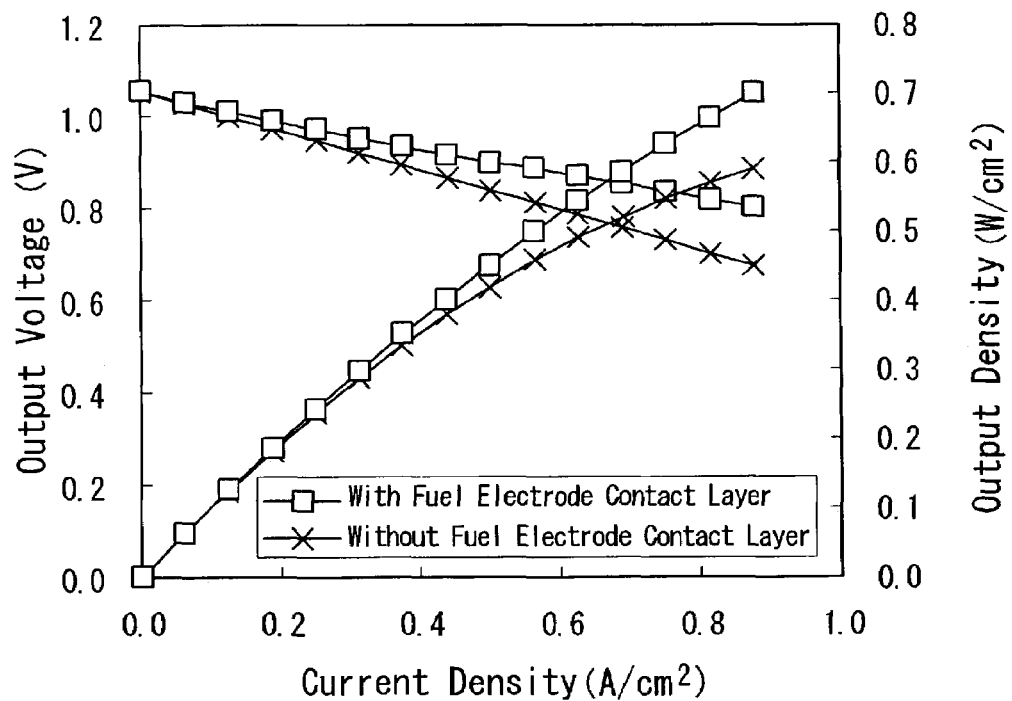
FIG. 6 is a graph showing a relationship of current density with output voltage and output density in the case of forming a fuel electrode contact layer on a surface of the fuel electrode and that in the case of not forming the layer thereon.

Besides, FIG. 6 shows a relationship of the current density with the output voltage and the output density in a case where the fuel electrode contact layer was formed on the fuel electrode and that in a case where the layer was not formed thereon. FIG. 6 indicates that the generating performance was more excellent when the fuel electrode contact layer was formed than when it was not formed. This is because the fuel electrode contact layer bridged the gap generated between the fuel electrode and the Pt mesh, and the contact resistance was thereby decreased to improve the current collection efficiency. Thus, it was confirmed that, even if completely the same single cell structure was adopted, unless the influences such as the current collecting resistance at the time of the current collection were considered, the generating performance as a whole was degraded.

(Durability Test)

Next, the durability test was performed using 20% hydrogen diluted with 3% humidified nitrogen (corresponding to methane-reformed gas of which oxygen partial pressure is S/C=2.0) as a fuel gas and using simulated air as an oxidant gas under constant load condition of the current density of 0.25 A/cm$^2$. Specifically, a compulsory oxidation test (referred to as a "Redox test" hereinafter) where air was introduced to the fuel electrode side at the generating test temperature (950° C.), and a thermal cycle test were performed, then degradation of the single cell against those tests were studied. As for the thermal cycle test, the supply gases were completely shut off from the fuel and air electrodes, and both the electrodes were cooled to an ambient temperature under naturally cooled conditions. Re-heating was performed at the temperature elevation speed of 250° C./h.

Figure 7:
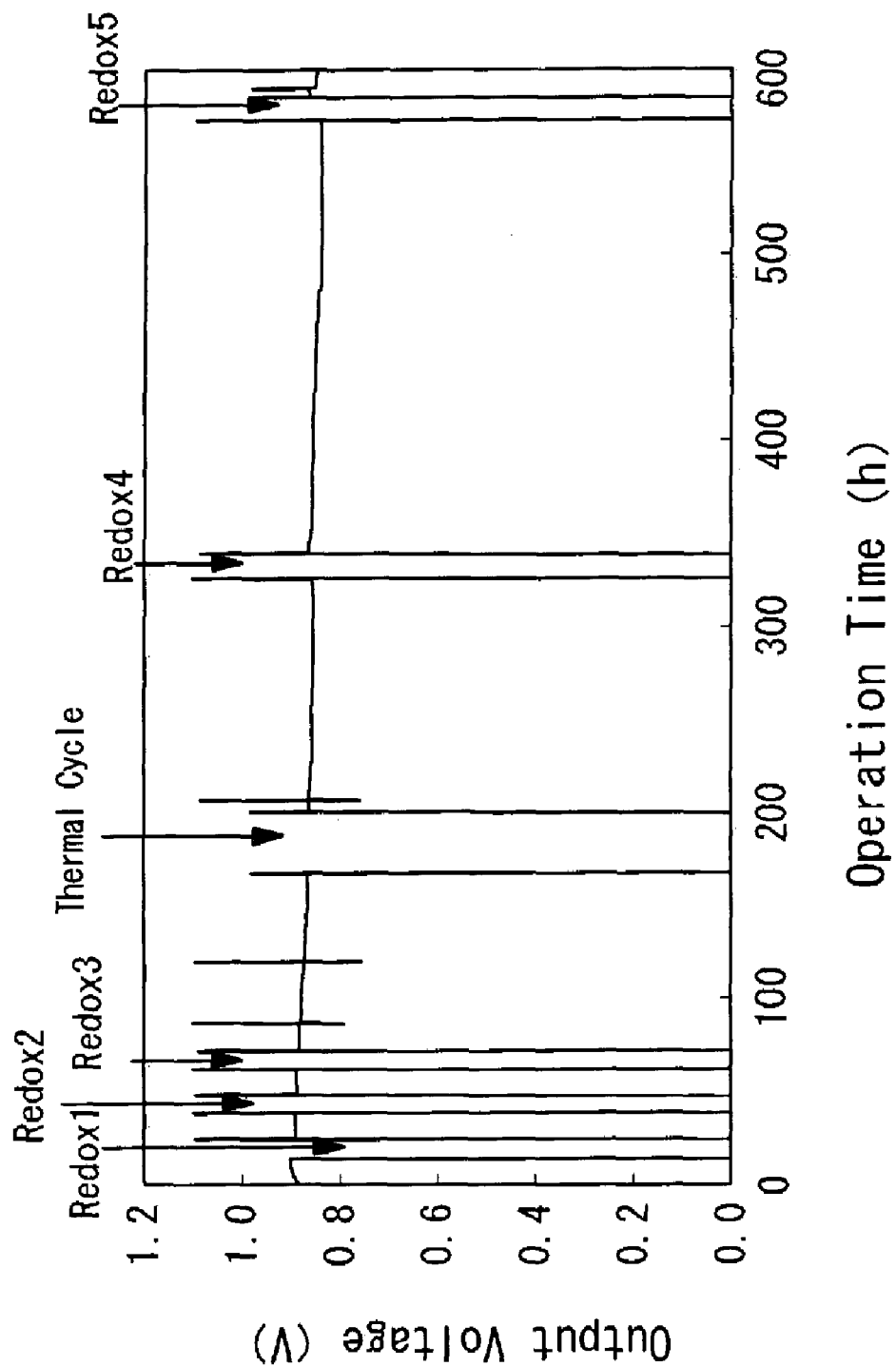
FIG. 7 is a graph showing a result of a durability test of the single cell consistent with one preferred embodiment of the present invention.

FIG. 7 shows a result of the durability test. The voltage was elevated by a current-carrying effect at the early stage of operation, and stabilized about 15 hours later. The value then was taken as an initial value, and the degradation rate about 600 hours later was obtained as about 4.5%. However, since the degradation of about 2.5% was generated before and after the thermal cycle, net degradation rate under the power generation state is about 2%. Though the degradation rate of the thermal cycle was great, almost no degradation was observed in the thermal cycle test under the condition of being purged with the nitrogen gas. Accordingly, it is considered that, under the condition that the gas was shut off from the electrodes as in this test, degradation was produced by a synergistic effect of the thermal cycle and the Redox cycle.

In addition, in the Redox test, variation in an OCV value (the open circuit voltage) or degradation in the generating performance was not observed before and after the test, and it was confirmed that sufficient durability was maintained against compulsory oxidation and reduction cycle of the fuel electrode.

In the above-mentioned preferred embodiment, the cell structure of the planar and self-standing film type is described. However, the present invention may be applicable to any structures of the planar and supported film type, or of tubular type and of integral type.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A single cell for a solid oxide fuel cell comprising:
a first solid electrolyte showing oxide ion conductivity;
a fuel electrode comprised of a cermet of a catalyst and a second solid electrolyte, the fuel electrode being bonded to one side of the first solid electrolyte; and
an air electrode comprised of a compound of perovskite type transition metal oxide with a third solid electrolyte, the air electrode being bonded to the other side of the first solid electrolyte,
wherein
the first solid electrolyte shows oxide ion conductivity at 1000° C. of 0.07 S/cm or more, and bending strength at ambient temperature of 700 MPa or more, and the second solid electrolyte shows oxide ion conductivity at 1000° C. of 0.20 S/cm or more,
a surface of the fuel electrode is coated with a fuel electrode contact layer comprised of a fuel electrode contact material containing metal particles, and a surface of the air electrode is coated with an air electrode contact layer comprised of an air electrode contact material containing a material of which electric conductivity in a temperature region for power generation is higher than electric conductivity of an air electrode material, and
an aqueous solution where a water-soluble noble metal compound is dissolved in water is previously impregnated into the air electrode.

2. The single cell according to claim 1, wherein the first solid electrolyte is a dispersion strengthened solid electrolyte where scandia-stabilized zirconia containing 3 to 6 mol % of $Sc_2O_3$ is a parent phase, 0.5 to 5 wt % of $Al_2O_3$ is dispersed in the scandia-stabilized zirconia, and a crystal phase is mainly comprised of a phase of a tetragonal crystal.

3. The single cell according to claim 2, wherein the $Al_2O_3$ mainly exists in grain boundaries of the scandia-stabilized zirconia.

4. A solid oxide fuel cell made by stacking a plurality of the single cells according to claim 3 via a separator.

5. The single cell according to claim 3, wherein a surface of the first solid electrolyte is made rough by surface treatment.

6. The single cell according to claim 5, wherein
the surface treatment is sandblast treatment, and
the first solid electrolyte has surface roughness where an Ra value is 0.075 or more and an S value is 16 or less.

7. The single cell according to claim 6, wherein
the fuel electrode is comprised of a cermet of Ni and scandia-stabilized zirconia containing 9 to 12 mol % of $Sc_2O_3$,
the fuel electrode contact material is slurry containing at least an Ni particle and a binder,
the air electrode is comprised of a compound of perovskite type transition metal oxide selected from the group consisting of $La_{1-x}Sr_xMnO_3$ (wherein $0.1 \leq x \leq 0.5$), $Pr_{1-x}Sr_xMnO_3$ (wherein $0.1 \leq x \leq 0.5$) and $La_{1-x}Sr_xCo_{1-y}Fe_yO_3$ (wherein $0.1 \leq x \leq 0.5$, $0.1 \leq y \leq 0.5$) with yttria-stabilized zirconia containing 8 to 10 mol % of $Y_2O_3$, the air electrode contact material is slurry containing at least an $La_{1-x}Sr_xCoO_3$ (wherein $0.1 \leq x \leq 0.5$) powder and a binder.

8. The single cell according to claim 7, wherein
the scandia-stabilized zirconia constituting a part of the fuel electrode further contains 2 mol % or less of at least one selected from the group consisting of $CeO_2$ and $Y_2O_3$, and a crystal phase of the scandia-stabilized zirconia is mainly comprised of a phase of a cubic crystal.

9. The single cell according to claim 8, wherein the water-soluble noble metal compound is a water-soluble palladium compound.

10. The single cell according to claims 9, wherein
the first solid electrolyte is formed in a plate shape, and thickness of the plate-shaped first solid electrolyte is within 50 to 300 μm.

11. A solid oxide fuel cell made by stacking a plurality of the single cells according to claim 10 via a separator.

12. The single cell according to claim 2, wherein a surface of the first solid electrolyte is made rough by surface treatment.

13. The single cell according to claim 12, wherein
the surface treatment is sandblast treatment, and
the first solid electrolyte has surface roughness where an Ra value is 0.075 or more and an S value is 16 or less.

14. A solid oxide fuel cell made by stacking a plurality of the single cells according to claim 2 via a separator.

15. The single cell according to claim 1, wherein a surface of the first solid electrolyte is made rough by surface treatment.

16. The single cell according to claim 15, wherein
the surface treatment is sandblast treatment, and
the first solid electrolyte has surface roughness where an Ra value is 0.075 or more and an S value is 16 or less.

17. A solid oxide fuel cell made by stacking a plurality of the single cells according to claim 16 via a separator.

18. A solid oxide fuel cell made by stacking a plurality of the single cells according to claim 15 via a separator.

19. The single cell according to claim 1, wherein
the fuel electrode is comprised of a cermet of Ni and scandia-stabilized zirconia containing 9 to 12 mol % of $Sc_2O_3$, the fuel electrode contact material is slurry containing at least an Ni particle and a binder, the air electrode is comprised of a compound of perovskite type transition metal oxide selected from the group consisting of $La_{1-x}Sr_xMnO_3$ (wherein $0.1 \leq x \leq 0.5$), $Pr_{1-x}Sr_xMnO_3$ (wherein $0.1 \leq x \leq 0.5$) and $La_{1-x}Sr_xCo_{1-y}Fe_yO_3$ (wherein $0.1 \leq x \leq 0.5$, $0.1 \leq y \leq 0.5$) with yttria-stabilized zirconia containing 8 to 10 mol % of $Y_2O_3$, the air electrode contact material is slurry containing at least an $La_{1-1}Sr_xCoO_3$ (wherein $0.1 \leq x \leq 0.5$) powder and a binder.

20. The single cell according to claim 19, wherein
the scandia-stabilized zirconia constituting a part of the fuel electrode further contains 2 mol % or less of at least one selected from the group consisting of $CeO_2$ and $Y_2O_3$, and a crystal phase of the scandia-stabilized zirconia is mainly comprised of a phase of a cubic crystal.

21. A solid oxide fuel cell made by stacking a plurality of the single cells according to claim 20 via a separator.

22. A solid oxide fuel cell made by stacking a plurality of the single cells according to claim 19 via a separator.

23. The single cell according to claim 1, wherein the water-soluble noble metal compound is a water-soluble palladium compound.

24. A solid oxide fuel cell made by stacking a plurality of the single cells according to claim 23 via a separator.

25. The single cell according to claims 1, wherein
the first solid electrolyte is formed in a plate shape, and thickness of the plate-shaped first solid electrolyte is within 50 to 300 μm.

26. A solid oxide fuel cell made by stacking a plurality of the single cells according to claim 25 via a separator.

27. A solid oxide fuel cell made by stacking a plurality of the single cells according to claim 1 via a separator.

* * * * *